United States Patent [19]

Symons

[11] Patent Number: 5,395,571

[45] Date of Patent: Mar. 7, 1995

[54] METHOD OF MAKING A BUILDING BOARD

[75] Inventor: Michael W. Symons, Pretoria, South Africa

[73] Assignee: Plascon Technologies (Proprietary) Limited, South Africa

[21] Appl. No.: 933,787

[22] Filed: Aug. 24, 1992

[30] Foreign Application Priority Data

Aug. 30, 1991 [ZA] South Africa ............. 91/6908

[51] Int. Cl.$^6$ ............................................. B29C 67/22
[52] U.S. Cl. ......................... 264/42; 264/45.3; 264/50; 264/53
[58] Field of Search ............... 264/45.3, 50, 51, 53, 264/54, 45.1, 42

[56] References Cited

U.S. PATENT DOCUMENTS

| | | | |
|---|---|---|---|
| 3,800,016 | 3/1974 | Roberts | 264/45.3 |
| 3,974,024 | 8/1976 | Yano et al. | 264/42 |
| 4,026,980 | 5/1977 | Hubbard | 264/46.4 |
| 4,122,203 | 10/1978 | Stahl | 264/46.4 |
| 4,127,628 | 11/1978 | Uchida et al. | 264/42 |
| 4,172,056 | 10/1979 | Marra | 428/529 |
| 4,306,395 | 12/1981 | Carpenter | 264/45.1 |
| 4,722,866 | 2/1988 | Wilson et al. | 428/411.1 |
| 4,810,569 | 3/1989 | Lehnert et al. | 156/39 |

FOREIGN PATENT DOCUMENTS

3414229 10/1985 Germany .
91/04291 4/1991 WIPO .

*Primary Examiner*—Allan R. Kuhns
*Attorney, Agent, or Firm*—Cushman Darby & Cushman

[57] ABSTRACT

A method of making a foamed building board or the like from the following components:

(a) a major amount by weight of an inorganic base material selected from the group consisting of a calcium sulphate hemi-hydrate, magnesium oxychloride, magnesium oxysulphate and a hydraulic cement;

(b) a suitable amount by weight of the inorganic base material of a thermosetting resin which is miscible, soluble or dispersable in water;

(c) a suitable amount of a catalyst for the thermosetting resin;

(d) water in an amount sufficient to rehydrate the inorganic base material with the water present in the other components;

(e) a suitable amount of a plasticizer such as a melamine formaldehyde condensate;

(f) a suitable amount of a polyvinyl alcohol;

(g) a suitable amount of a retarder for the setting time of the inorganic base material;

(h) a suitable amount of a fibrous reinforcing material; and (i) a suitable amount by weight of a foam or a foaming agent; which comprises the steps of:

(1) mixing together components (a), (b), (c), (d), (e), (f) and (g);

(2) adding component (h) into the mixture of step (1);

(3) adding component (i) into the mixture of step (2) with stirring to give a foamed product;

(4) forming the product of step (3) into a building board; and (5) allowing rehydration of the inorganic base material to occur and curing of the thermosetting resin to occur.

15 Claims, No Drawings

METHOD OF MAKING A BUILDING BOARD

BACKGROUND OF THE INVENTION

This invention relates to a method of making a building board or the like and to the building board so made.

Conventional inorganic building boards include fibre reinforced cement and gypsum boards, the latter often lined on both sides with kraft paper. These boards are tried and tested building products which are cost effective and which do not support combustion. The ability of these boards to attenuate sound transference by absorption is generally poor as a result of their impervious, dense nature. Additionally, these boards are heavy with bulk densities generally approaching two, requiring that they be supported at close centres during fixing, and resulting in the fact that handling and transportation is costly, that breakage is frequent, and that costs are accordingly affected.

The concept of cellular cement or gypsum boards is not new, but in the former case unless the cement board is autoclaved during production, the setting time is long, requiring protracted periods in the formers, and full strength is developed only after a period of weeks, and the foamed cement is subject to cracking, particularly at densities less than 1000 k/m$^3$. In the case of gypsum, poor mechanical properties result. In both cases, extension using expanded perlite, vermiculite or mineral wool results in excessive friability.

There is thus a need for a method of making a building board which is light, cost effective, with good acoustic properties, which does not lose its structural integrity on wetting, which has good mechanical properties, and whose density may be varied.

SUMMARY OF THE INVENTION

According to a first aspect of the invention there is provided a method of making a foamed building board or the like from the following components:
  (a) a major amount by weight of an inorganic base material selected from the group consisting of a calcium sulphate hemi-hydrate, magnesium oxychloride, magnesium oxysulphate and a hydraulic cement;
  (b) a suitable amount by weight of the inorganic base material of a thermosetting resin which is miscible, soluble or dispersable in water;
  (c) a suitable amount of a catalyst for the thermosetting resin;
  (d) water in an amount sufficient to rehydrate the inorganic base material with the water present in the other components;
  (e) optionally a suitable amount of a plasticizer such as a melamine formaldehyde condensate;
  (f) optionally a suitable amount of a polyvinyl alcohol;
  (g) optionally a suitable amount of a retarder for the setting time of the inorganic base material;
  (h) optionally a suitable amount of a fibrous reinforcing material; and
  (i) a suitable amount by weight of a foam or a foaming agent; which comprises the steps of:
    (1) mixing together components (a), (b), (c) and (d) and (e), (f) and (g) if present;
    (2) adding component (h) if present into the mixture of step (1);
    (3) adding component (i) into the mixture of step (2) with stirring to give a foamed product;
    (4) forming the product of step (3) into a building board; and
    (5) allowing rehydration of the inorganic base material to occur and curing of the thermosetting resin to occur.

Preferred components for use in the method of the invention comprise:
  (a) a major amount by weight of calcium sulphate hemi-hydrate;
  (b) 5 to 30% inclusive, more preferably 10 to 20% inclusive by weight of the inorganic base material of the thermosetting resin when the thermosetting resin comprises a phenolic resin, a polyester resin or an epoxy resin, the preferred resin being a phenolic resin; or 6 to 8% inclusive by weight of the inorganic base material of the thermosetting resin when the thermosetting resin comprises a furan resin;
  (c) a suitable amount of a catalyst for the thermosetting resin;
  (d) water in an amount sufficient to provide with the water present in the other components approximately the amount of water required for complete rehydration of the calcium sulphate hemi-hydrate;
  (e) 0.5 to 2.5% inclusive by weight, preferably about 1% by weight of the inorganic base material of a melamine formaldehyde condensate; and
  (f) 0.5 to 2.5% inclusive by weight, preferably about 1% by weight of the inorganic base material of a polyvinyl alcohol;
  (g) 0.001 to 0.25% inclusive by weight of the inorganic base material of a retarder which is preferably sodium carboxymethyl cellulose or alternatively Retardan P, malic acid or citric acid;
  (h) 0.05 to 2.5% inclusive by weight of the inorganic base material of a fibrous reinforcing material such as cellulose fibres, glass fibres, polyester fibres or acrylic fibres;
  (i) 0.5 to 12 times the volume of the combined volume of components (a) to (g) of a foam, or sufficient of a foaming agent to give an increase in volume of components (a) to (g) of 50% or more, up to 800%.
  (j) 0.001 to 0.05% inclusive by weight of components (a) to (i) of a surfactant, preferably a silicone glycol co-polymer.

Component (i) may either be a foam or a foaming agent. When component (i) is a foam it is preferably a foam made from a 2 to 12% solution of polyvinyl alcohol, the foam having a density of 40 to 125 grams per liter, the foam being created by the introduction of a gas such as air into the polyvinyl alcohol solution. When component (i) is a foaming agent it may be any suitable foaming agent i.e. an agent which generates a gas by a chemical reaction, such as an inorganic carbonate salt, such as sodium bicarbonate or calcium carbonate.

Component (j) is preferably added with the foam or foaming agent. For example, it may be added into the polyvinyl alcohol solution from which the foam is generated.

Preferably in step (4) of the method of the invention, the product of step (3) is formed into a building board by moulding or extrusion, or other suitable means.

After step (5) of the method of the invention, the building board may be impregnated to a desired depth, preferably by dipping or spraying, with a composition comprising a thermosetting resin, an extending liquid therefor and containing a catalyst therefor, followed by recovery of the extending liquid and curing of the thermosetting resin.

Examples of suitable compositions include:
(i) 10 to 60% by weight of an unsaturated polyester resin in dichloromethane and containing a latent catalyst triggered at a temperature of approximately 70° C.; and
(ii) 10 to 60% by weight of a phenol formaldehyde resol resin in methyl alcohol or methyl alcohol-/acetone blend pre-catalysed with from 2 to 12% of an acid catalyst such as toluene sulphonic acid or phosphoric acid;
(iii) 5 to 40% by weight of a furan resin optionally with a co-reactant catalysed with 2 to 12% of an acid catalyst in an equal weight of methyl alcohol, with typically 3% of a linking solvent such as a glycol, all in dichloromethane.

The building board may be covered on one or both sides with a suitable sheet material such as kraft paper or may be painted.

According to a second aspect of the invention there is provided a building board or the like made by the method of the invention.

DESCRIPTION OF EMBODIMENTS

The first aspect of the invention is a method of making a foamed building board or acoustic tile or the like from various components.

The first component is a major amount, i.e. 50% or more by weight of an inorganic base material selected from a calcium sulphate hemi-hydrate, magnesium oxychloride, magnesium oxysulphate and a hydraulic cement.

The preferred inorganic base material is calcium sulphate hemi-hydrate. The calcium sulphate may be either alpha hemi-hydrate or beta hemi-hydrate or a mixture of the two. The alpha hemi-hydrate and the beta hemi-hydrate have different water demands and yield different crystalline structures on rehydration. The theoretical amount of water for complete rehydration of calcium sulphate hemi-hydrate is 18.5 grams of water per 100 grams of hemi-hydrate. The practical amount of water for complete rehydration is of the order of 33 grams per 100 grams of the alpha hemi-hydrate and up to 70 grams per 100 grams of the beta hemi-hydrate. On rehydration, the calcium sulphate increases volume slightly and the oversaturated solution of calcium sulphate, on exposure to water, first flocculates and then crystallises to form a rigid solid material. Rehydration goes to completion over a period of about 2 hours. The maximum temperature rise as a result of exothermic reaction is up to 45° C.

As an alternative to calcium sulphate hemi-hydrate, there may be used as the inorganic base material a magnesium oxychloride, a magnesium oxysulphate or a hydraulic cement such as cement fondue lafarge which contains approximately 40% aluminium oxide and is composed mainly of calcium aluminates, with complex calcium alumina ferrites and alumina silicates.

The second component is a thermosetting resin which is miscible, soluble or dispersable in water. The thermosetting resin is added to the inorganic base material to enable a slurry to be created without the addition of water beyond the amount of water required for complete rehydration of the inorganic base material.

Suitable thermosetting resins include phenolic resins, urea formaldehyde resins, polyester resins, furan resins, i.e. resins containing a furan ring, and epoxy resins. As stated, these resins must be miscible, soluble or dispersable in water and must be unaffected in their polymerisation or cross-linking by the presence of water.

The preferred thermosetting resin is a phenolic resin. Generally, these phenolic resins are acid catalysed for cold setting and consist of mixtures of mono-, di- and tri- methylated phenolic structures in mono-, di- and trimeric form, which are cross-linked to form three dimensional networks. Examples of suitable phenolic resins include the phenol formaldehydes or resols of low viscosity and particularly those of medium to low reactivity sold by British Industrial Plastics under the codes 17-1390 and the Norsophen resins 1200 to 1204 and 1703 and catalysed with a catalyst of British Industrial Plastics referred to as D-1650 in the ratio of 6 to 12 parts of catalyst per 100 parts of resin. Other suitable phenolic resins include Polylam 2432 from Polyresin Products a division of National Chemical Products Limited, Cellobond J2027L, J2018L, J2020/96L or J20/1081L from British Petroleum Company plc, catalysed with a catalyst of British Petroleum Company plc known as Phencat 10 or Phencat 15, or PRP VCM90 or VX21. Typical properties of these resins are a specific gravity at 25° C. of 1.24 to 1.25. pH of 7.3 to 7.8, and free formaldehyde level of 2.5% maximum. Another example of a suitable phenolic resin is a phenol resorcinol.

A suitable polyester resin is Polylite 321/83X of Polyresin Products, a division of National Chemical Products Limited. A suitable epoxy resin is Araldite PY.340-2 of Ceiba Geigy AG.

Suitable furan resins are those in the series 1 to 4 by C G Smith Chemicals Development Limited, or thermosetting polymers based on the furan ring, preferably those derived from furfural alone or with formaldehyde, amines or furfural alcohol, or furfural or furfural alcohol with polyurethanes or with phenols, all with suitable catalysts.

The thermosetting resin when it is a phenolic resin, a polyester resin or an epoxy resin, is present in the amount of 5 to 30% by weight, preferably 10 to 20% by weight, more preferably about 12% by weight of the inorganic base material, and when it is a furan resin is present in the amount of 6 to 8% by weight of the inorganic base material.

The presence of the thermosetting resin not only drops the water demand of the inorganic base material but also synergistically binds, reinforces and waterproofs the inorganic base material and accelerates the setting time of the inorganic base material.

The third component is a suitable amount of a catalyst for the thermosetting resin. Suitable catalysts for the various types of thermosetting resin have been discussed above. Other suitable catalysts include phosphoric and sulphonic acids, or acid pre-cursors such as ammonium chloride, sodium bichromate and ammonium bichromate. The amount of catalyst used will depend on the nature of the thermosetting resin and on the quantity of thermosetting resin used, but will be easily determinable by a person skilled in the art.

The fourth component is water in a amount sufficient to rehydrate the inorganic base material with the water present in the other components. Thus, the water required for rehydration of the inorganic base material is obtained from the added water and from the water contained for example in the thermosetting resin. When the inorganic base material is calcium sulphate hemi-hydrate, water is preferably added in the amount sufficient to provide with the water present in the other components approximately the amount of water required for complete rehydration of the calcium sulphate hemi-hydrate.

The fifth component is optionally a suitable amount of a plasticizer, preferably a melamine formaldehyde condensate. A suitable example of a melamine formaldehyde condensate is Melment F10 of Hoechst. The melamine formaldehyde condensate has the effect of lowering the viscosity of the inorganic base material/water mix, it reduces the water demand of the inorganic base material and it extends the setting time of the inorganic base material. Thus, the balance between the catalyst for the thermosetting resin and the melamine formaldehyde condensate, allows the formulation gel point to be varied to suit the operating procedures. Other suitable plasticizers such as sulfonated melamine-formaldehyde condensate, sulfonated ditolyl ether-formaldehyde condensate, sulfonated naphthalene-formaldehyde condensate, sulfonated and alkylated phenol-formaldehyde condensate or lignin sulfonate may be used.

The plasticizer, e.g. the melamine formaldehyde condensate is preferably added to the composition in an amount of 0.5 to 2.5% by weight of the inorganic base material, more preferably about 1 to 1.5% by weight of the inorganic base material.

The sixth component is optionally a suitable amount of a polyvinyl alcohol. An example of a suitable polyvinyl alcohol is Mowiol of Hoechst, codes 10-74 to 30-92, and 4-88 to 40-88 with the degree of hydrolysis varying from 73.5 to 92.4 respectively and fully saponified grades 4-98 to 66-100 with the degree of hydrolysis varying from 98.4 to 99.7 respectively. The polyvinyl alcohol is added to increase water resistance after drying, to provide colloidal protection preventing phase separation of the mix during processing and to esterify with free aldehydes and residual acid therefore removing these from the composition. Mowiol 4-88 is the preferred polyvinyl alcohol.

The seventh component is optionally a suitable amount of a retarder, preferably sodium carboxymethyl cellulose.

The eighth component is optionally a suitable amount of a fibrous reinforcing material such as cellulose fibres, glass fibres, polyester fibres or acrylic fibres, which are randomly dispersed into the other components for the purpose of reinforcement and imposing shock resistance. The preferred fibres are cellulose fibres. The fibrous reinforcing material may be included in the form of a sheet of the fibres or preferably as a random dispersion of fibres.

The ninth component is a suitable amount of a foam or a foaming agent. This component is included to create a foamed product. The amount of the foam or foaming agent used will depend on the density required of the foamed product.

The foam may be for example a protein based foam concentrate comprised of hydrolised protein with stabilizers and preservatives, of a specific gravity of 1.13 to 1.14 and a pH typically of 6.5 to 7.5, used at a concentration of 1.5 to 3% dilution in water. However, the preferred foam is a foam generated from a 2 to 12% solution, preferably a 5% solution of polyvinyl alcohol optionally with a surfactant, and optionally with a blowing agent such as dimethyl ether or a chlorinated fluorinated hydrocarbon, and aerated or otherwise gasified to give a foam with a density of 40 to 125 grams per liter, which equals an expansion ratio of 1:15 to 1:9 respectively.

This foam may then be added to the other components at a rate of from 0.5 to 12, preferably 2 to 12 times the volume of the other components, depending on the density desired of the foamed product.

The tenth component is optionally a suitable amount of a surfactant compatible with all the components of the formulation, such as a silicone glycol co-polymer such as Dow Corning DC 197 in the amount of 0.001% to 0.05% by weight, which is used in order to drop the surface tension of the foam and inorganic/thermosetting resin formulation giving rise to foam stability.

The first step of the method of the invention is to mix together components (a), (b), (c) and (d), and (e), (f) and (g) if present. These components may be mixed for example in a planetary mixer or high speed disperser or a combination of the two, preferably under vacuum.

The component (c) may be pre-mixed with component (b) and then added to the other components. Alternatively components (a), (b) and (d), and (e), (f) and (g) if present, may be mixed, and component (c) added to this mixture.

In the second step of the method of the invention component (h) if present is added into the product of step (1).

In the third step of the method of the invention, component (i) is added to the product of step (2) with stirring. For example, when component (i) is a foam it may be folded into the product of step (2), for instance in a planetary mixer with slow revolutions and without vacuum. This creates a foamed product.

In the fourth step of the method of the invention the product of step (3) is formed into the building board or the like, for example by moulding or by extrusion for example on to a moving conveyor on which it is cut to length, typically by wire cutters after preliminary setting.

In the fifth step of the method of the invention rehydration of the inorganic base material occurs and curing of the thermosetting resin occurs. For example, the boards may be removed from their moulds or from the conveyor as the case may be, immediately after setting, and stacked in a humidified trolley which is closed to prevent too rapid drying of the boards. Rehydration of the inorganic base material now takes place. For example, when the inorganic base material is calcium sulphate hemi-hydrate, rehydration takes approximately 2 to 3 hours, and thereafter, the boards are left desirably for a further two hour period to allow water stabilisation. At this stage, curing of the thermosetting resin is also induced by the imposition of space heating up to a maximum of 80° C. or alternatively heat induction. This may be assisted for example by passing the boards, on a conveyor, under a magnetron or the wave guides of a microwave emitter stationed above and below the conveyor, to raise the temperature of the boards to about 80° C. to fully cure the thermosetting resin.

Thereafter, the boards may be impregnated to a desired depth with a composition comprising a thermosetting resin in an extending liquid therefor and containing a catalyst, as described above. After impregnation, the boards are placed in a room or closed area for the recovery of the extending liquid for re-use. Thereafter the board is again heated to the trigger temperature of the thermosetting resin, which then polymerises providing improved mechanical properties and proofness to weather and water, allowing the use of the boards in exterior applications.

Thereafter, the boards may be covered with a sheet material on either or both sides, for example by kraft paper, or the boards may be painted. Alternatively, the boards may be incorporated into a composite structure.

Alternatively the board may be sandwiched between kraft paper on either side before the setting by rehydration of the inorganic base material and, then the resin modification described above would not be conducted.

An example of components for use in the method of the invention will now be given.

| | |
|---|---|
| Calcium sulphate alpha hemi-hydrate | 400 g |
| Melment F10 (Hoechst) | 6 g |
| Water | 60 g |
| Phenolic resin - British Industrial Plastics Code 17 1390 | 50 g |
| Catalyst - British Industrial Plastics D16 50 | 6 g |
| 10% solution of Mowiol 8-88 (Hoechst) | 65 g |
| Sodium carboxymethylcellulose | 0.1 g |
| Polyvinyl alcohol 40-88 Mowiol (Hoechst) 5% solution foamed with 30 g dimethyl ether to give 250 cc foam | |

The composition contains an amount of 125 g of water which gives a calcium sulphate hemi-hydrate to water ratio of 3.3 to 1 as against the theoretical rehydration demand of approximately 5 to 1.

The composition contains a catalyst for the phenolic resin in the amount of about 12% by weight.

This composition was formed into a foamed board by the method of the invention as outlined above.

To summarise the functions of the various components of the example given above, the calcium sulphate hemi-hydrate forms the major component which, when converted from the hemi-hydrate to the di-hydrate, creates a rigid board. This process uses the added water plus most of the free water in the composition provided by the other components such as the phenolic resin. This obviates the need for excessive post-drying and means that the composition can be as close to solventless as is practically possible. The thermosetting resin, catalysed by a suitable catalyst, binds the inorganic base material into the board. This combination of thermosetting resin and catalyst also serves to accelerate rehydration of the calcium sulphate hemi-hydrate. The setting speed of the composition is counterbalanced by the use of a melamine formaldehyde condensate which serves to reduce water demand, reduce viscosity and at the same time retard the setting or rehydration of the calcium sulphate hemi-hydrate. Sodium carboxymethylcellulose may also be used to extend the setting time of the composition. The acceleration of the catalyst can therefore be balanced to the deceleration of the melamine formaldehyde condensate. The polyvinyl alcohol reacts with the acid catalyst or the melamine formaldehyde condensate or the aldehyde fractions from the resin to form an insoluble ester, further contributing to water proofness, binding and shock resistance. The foam extends the volume of the composition by a factor of from 0,5 to 12 whereby the density of the foamed board may be varied for example from 150 to 1000 kg per cubic meter, depending on the end use of the board. The board of the invention is entirely suitable for the use as an acoustic ceiling tile, a ceiling board, a dry wall partition board and the like.

The board has the advantages that it does not shrink during manufacture, it does not warp after setting and curing, it has a low water absorption, and is not water sensitive, i.e. does not swell, it is not susceptible to harbouring of micro-organisms, it has adequate strength, both flexile and compressive, and is fireproof, it has excellent acoustic absorption, it contributes to thermal insulation, it is light and easy to handle and it is quick and economic to produce.

I claim:

1. A method of making a foamed building board from the following components:
   (a) a major amount by weight of an inorganic base material selected from the group consisting of a calcium sulphate hemi-hydrate, magnesium oxychloride, and magnesium oxysulphate;
   (b) a suitable amount by weight of the inorganic base material of a thermosetting resin which is miscible, soluble or dispersable in water and which is selected from the group consisting of a phenolic resin, a polyester resin and a furan resin;
   (c) a suitable amount of a catalyst for the thermosetting resin;
   (d) water in an amount sufficient to rehydrate the inorganic base material with the water present in the other components;
   (e) optionally a suitable amount of a plasticizer;
   (f) optionally a suitable amount of polyvinyl alcohol;
   (g) optionally a suitable amount of a retarder for the setting time of the inorganic base material;
   (h) optionally a suitable amount of a fibrous reinforcing material; and
   (i) 0.5 to 12 times the volume of the combined volume of components (a) to (g) of a foam made from a 2 to 12% inclusive solution of polyvinyl alcohol, the foam being created by the introduction of a gas into the polyvinyl alcohol solution
   the method comprising the steps of:
   (1) mixing together components (a), (b), (c) and (d), and (e), (f) and (g) if present;
   (2) adding component (h) if present into the mixture of step (1);
   (3) adding component (i) into the mixture of step (2) with stirring to give a foamed product;
   (4) forming the product of step (3) into a building board; and
   (5) allowing rehydration of the inorganic base material to occur and curing of the thermosetting resin to occur.

2. A method according to claim 1 wherein the inorganic base material is calcium sulphate hemi-hydrate.

3. A method according to claim 1 wherein component (b) comprises 5 to 30% inclusive by weight of the inorganic base material of a thermosetting resin selected from the group consisting of a phenolic resin and a polyester resin.

4. A method according to claim 3 wherein component (b) comprises 10 to 0% inclusive by weight of the inorganic base material of the thermosetting resin.

5. A method according to claim 1 wherein component (b) comprises 6 to 8% inclusive by weight of the inorganic base material of a thermosetting resin which is a furan resin.

6. A method according to claim 1 wherein component (e) comprises 0.5 to 2.5% by weight of the inorganic base material of a melamine formaldehyde condensate.

7. A method according to claim 1 wherein component (f) comprises 0.5 to 2.5% inclusive by weight of the inorganic base material of a polyvinyl alcohol.

8. A method according to claim 1 wherein component (g) comprises 0.001 to 0.25% inclusive by weight of the inorganic base material of the retarder.

9. A method according to claim 8 wherein the retarder is sodium carboxymethyl cellulose.

10. A method according to claim 1 wherein component (h) comprises 0.05 to 2.5% inclusive by weight of the inorganic base material.

11. A method according to claim 1 wherein dimethyl ether is added to the polyvinyl alcohol solution as a blowing agent.

12. A method according to claim 1 wherein the components include:
   (j) 0.001 to 0.05% inclusive by weight of components (a) to (i) of a surfactant.

13. A method according to claim 1 wherein in step (4) the product of step (3) is formed into a building board by moulding or extrusion.

14. A method according to claim 1 wherein after step (5) the building board is impregnated to a desired depth with a composition comprising a thermosetting resin, an extending liquid for the thermosetting resin and a catalyst for the thermosetting resin, followed by recovery of the extending liquid and curing of the thermosetting resin.

15. A method of making a foamed building board from the following components:
   (a) a major amount by weight of an inorganic base material selected from the group consisting of a calcium sulphate hemi-hydrate, magnesium oxychloride, and magnesium oxysulphate;
   (b) 5 to 30% inclusive by weight of the inorganic base material of a phenolic resin which is miscible, soluble or dispersable in water;
   (c) a suitable amount of a catalyst for the phenolic resin;
   (d) water in an amount sufficient to rehydrate the inorganic base material with the water present in the other components;
   (e) 0.5 to 2.5% inclusive by weight of the inorganic base material of a melamine formaldehyde condensate;
   (f) 0.5 to 2.5% inclusive by weight of the inorganic base material of a polyvinyl alcohol;
   (g) 0.001 to 0.25% inclusive by weight of the inorganic base material of sodium carboxymethyl cellulose;
   (h) 0.05 to 2.5% inclusive by weight of the inorganic base material of a fibrous reinforcing material;
   (i) 0.5 to 12 times the volume of the combined volume of components (a) to (g) of a foam or sufficient of a foaming agent to give an increase in volume of components (a) to (g) of 50% or more;
the method comprising the steps of:
   (1) mixing together components (a), (b), (c), (d), (e), (f) and (g);
   (2) adding component (h) into the mixture of step (1);
   (3) adding component (i) into the mixture of step (2) with stirring to give a foamed product;
   (4) forming the product of step (3) into a building board; and
   (5) allowing rehydration of the inorganic base material to occur and curing of the thermosetting resin to occur.

* * * * *